F. KRUPICKA.
FLOOD FENCE.
APPLICATION FILED AUG. 2, 1912.
1,059,881.
Patented Apr. 22, 1913.
2 SHEETS—SHEET 1.
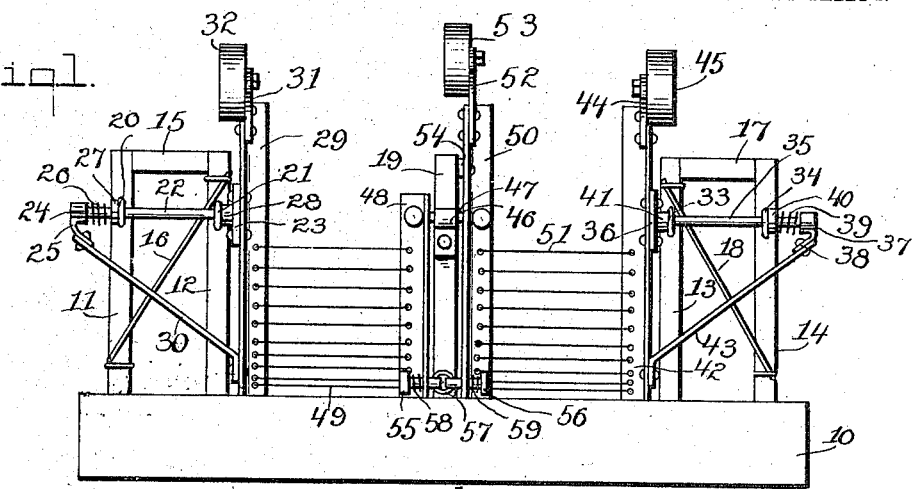
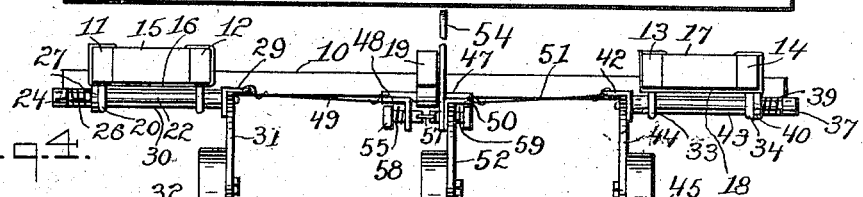
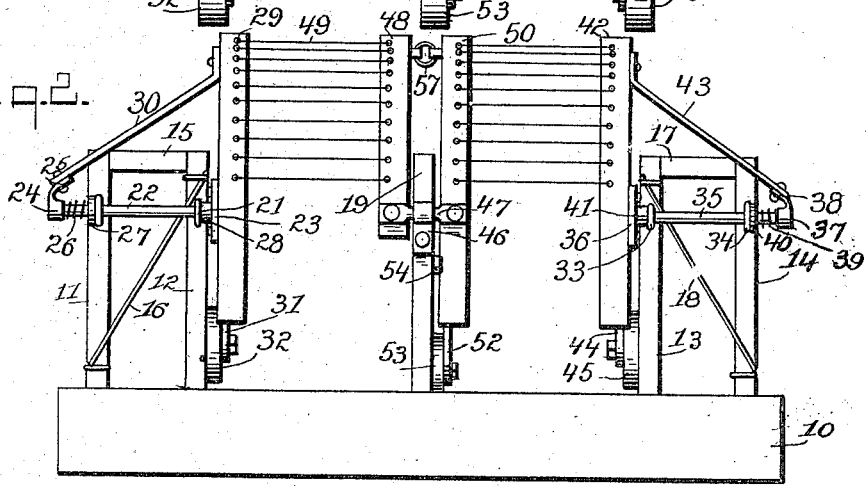
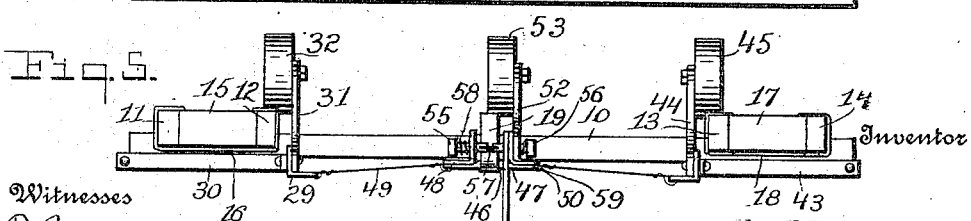

F. KRUPICKA.
FLOOD FENCE.
APPLICATION FILED AUG. 2, 1912.
1,059,881. Patented Apr. 22, 1913.
2 SHEETS—SHEET 2.
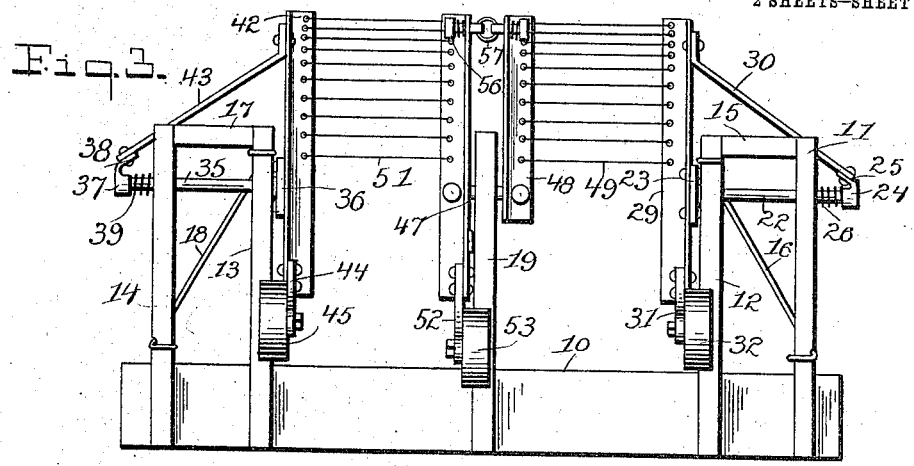
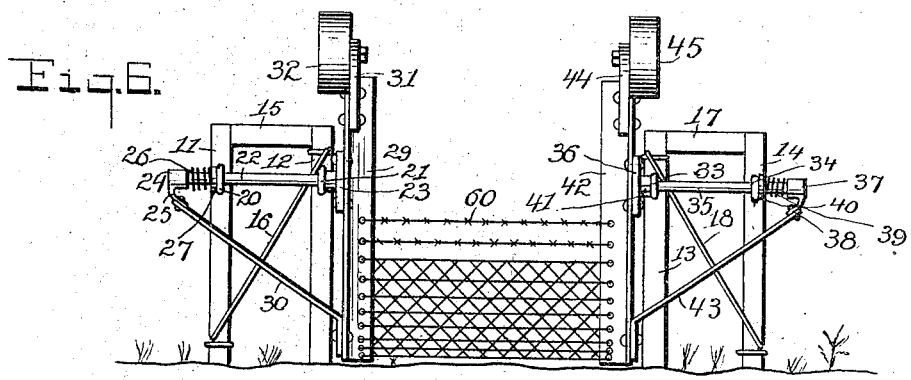
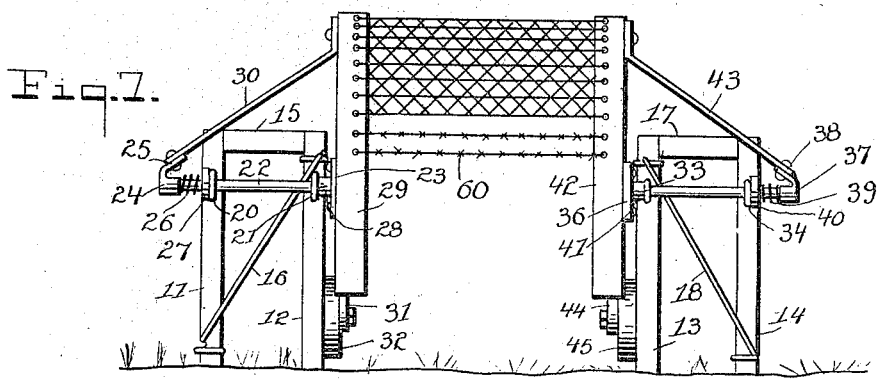
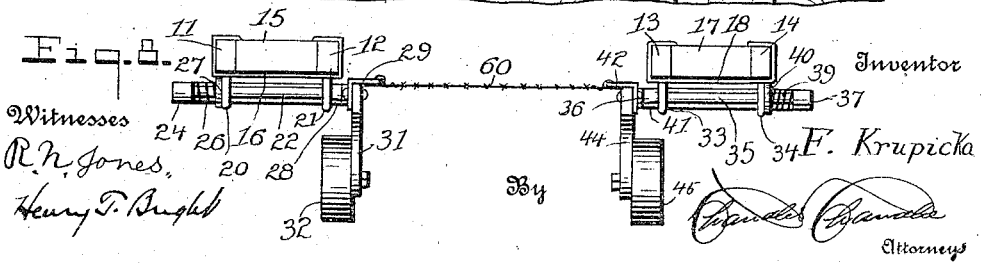

UNITED STATES PATENT OFFICE.

FRANK KRUPICKA, OF FRIEND, NEBRASKA.

FLOOD-FENCE.

1,059,881.

Specification of Letters Patent.

Patented Apr. 22, 1913.

Application filed August 2, 1912. Serial No. 712,947.

*To all whom it may concern:*

Be it known that I, FRANK KRUPICKA, a citizen of the United States, residing at Friend, in the county of Saline, State of Nebraska, have invented certain new and useful Improvements in Flood-Fences; and I do hereby declare the following to be a full, clear, and exact description of the invention, such as will enable others skilled in the art to which it appertains to make and use the same.

This invention relates to fences and particularly to the construction of sections thereof which are adapted to be disposed across valleys or gullies which constitute a drain for large quantities of water during excessive rain.

The object of the invention resides in the provision of a fence section for the purposes named which is so constructed and arranged that when an excessive quantity of water is passing through the valley or gully across which the fence section is disposed the pressure of the water and the drift carried thereby will automatically move the fence section to a position that will permit the free passage of such water and drift and thereby relieve the fence section from strain and obviate the possibility of same being washed away.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a front elevation of a fence section constructed in accordance with the invention the parts thereof being in the position they would normally occupy, Fig. 2, a view similar to Fig. 1 showing the parts of the fence section in the position they would occupy after they have been moved by the pressure of the water and drift to allow the free passage of such water and drift through the fence, Fig. 3, a rear elevation of what is shown in Fig. 2, Fig. 4, a plan view of what is shown in Fig. 1, Fig. 5, a plan view of what is shown in Fig. 2, Fig. 6, a view similar to Fig. 1 showing a modified form of the invention particularly adapted for fencing across a relatively narrow valley, Fig. 7, a view similar to Fig. 6, showing the parts of the fence section in the position they would occupy when same have been moved by the pressure of water and drift to permit the free passage of such water and drift through the fence, and Fig. 8, a plan view of what is shown in Fig. 6.

Referring to the drawings the fence section is shown as comprising a sill 10. Secured to one end of the sill 10 are spaced uprights 11 and 12, while corresponding spaced uprights 13 and 14 are secured to the other end of the sill 10. The uprights 11 and 12 are connected together at their upper ends by a cross beam 15 and are additionally strengthened by means of braces 16. Likewise the uprights 13 and 14 are connected together at their upper ends by a cross beam 17 and additionally strengthened by means of braces 18. Secured to the sill 10 between the uprights 12 and 13 is an upright 19.

The sill 10 and the lower end of the various uprights heretofore referred to are embedded in the ground across the valley or gully so as to form a frame work of suitable strength for supporting the movable parts of the fence section.

Mounted on the uprights 11 and 12 are horizontally alined journal bearings 20 and 21 respectively in which is rotatably mounted a shaft 22. The end of the shaft 22 adjacent the upright 19 is provided with a cross arm 23, while the end of said shaft adjacent the upright 11 has fixed thereon a collar 24 provided with an inturned tongue 25. Encircling the shaft 22 between the bearing 20 and the collar 24 is a coil spring 26 one end of which bears against the collar 24 while the other end thereof bears against a washer 27 slidable on the shaft 22.

Loosely mounted on the shaft 22 between the cross arm 23 and bearing 21 is a collar 28 which serves to limit the outward longitudinal movement of the shaft 22 under the influence of the spring 26.

Secured to the cross arm 23 is an angle iron 29 one end of which is connected by a brace member 30 to the inturned tongue 25 of the collar 24. The other end of the angle iron 29 has secured thereto an arm 31 the free end of which is directed laterally in a plane at right angles to the shaft 22 and rotatably supports a weight element 32.

Mounted upon the uprights 13 and 14 are horizontally alined journal bearings 33 and 34 respectively in which is rotatably supported a shaft 35. The end of the shaft 35 adjacent the upright 13 is provided with a cross arm 36 while the end thereof adjacent the upright 14 is provided with a fixed collar 37 having an inturned tongue 38.

Encircling the shaft 35 between the collar 37 and the journal bearing 34 is a coil spring 39 one end of which bears against the collar 37 while the other end thereof bears against the washer 40 slidably arranged on the shaft 35 and engaging the outer side of the journal bearing 34.

Loosely mounted upon the shaft 35 between the cross arm 36 and bearing 33 is a collar 41 which serves to limit the outward longitudinal movement 35 under the influence of the spring 39.

Secured to the cross arm 36 is an angle iron 42 one end of which is connected by a brace element 43 to the inturned tongue 38 of the collar 37. The other end of this angle iron 42 has secured thereto an arm 44 the free end of which is directed laterally similar to the arm 31 and rotatably supports a weight element 45.

Mounted upon the upright 19 in line with the bearings 21 and 23 is a bearing 46 and journaled in this bearing 46 is a shaft 47. Secured to one end of the shaft 47 is an angle iron 48 which is connected to the angle iron 29 by a plurality of fence stringers 49. These stringers 49 it will be understood only connect the angle irons 48 and 29 at points remote from the arm 31 carried by the angle iron 29. Secured to the other end of the shaft 47 is an angle iron 50 one end of which is connected to the angle iron 42 by means of fence stringers 51 while the other end thereof has secured thereto an arm 52 bent laterally in a manner corresponding to the arms 31 and 44 and rotatably supporting at its free end a weight element 53. This angle iron 50 also has secured thereto an arm 54 directed laterally opposite to the arm 52. Slidably mounted in corresponding ends of the angle irons 48 and 50 are pins 55 and 56 respectively which have their adjacent ends connected together by a link 57. Encircling the pin 55 is a coil spring 58 one end of which bears against the head of the pin 55 while the other end thereof bears against the angle iron 48. Encircling the pin 56 is a coil spring 59 one end of which bears against the head of the pin 56 while the other end thereof bears against the angle iron 50. By the use of the spring elements 58, 89, 39 and 26 it will be apparent that the movable parts of the fence section can yield in a direction transverse of the plane of their movement so as to obviate the possibility of such movable parts being subjected to a breaking strain.

Under normal conditions the parts of the fence are in the position shown in Fig. 1. However, should the weight of water and drift carried thereby become excessive it will gradually force the lower end of the angle irons in Fig. 1 and the fence stringers 49 and 51 outwardly. This movement of the angle irons will at the same time cause the weight elements 32, 45 and 53 to move inwardly and when these elements pass inward of the vertical plane of the shafts 22, 47 and 35 they will automatically operate under the influence of gravity to move the various angle irons to the position shown in Fig. 2 when the water and drift carried thereby can pass freely through the fence. When the water has subsided the parts of the fence can be manually returned to the position shown in Fig. 1 with the assistance of the arm 54.

In Figs. 6, 7 and 8 there is disclosed a fence section adapted for use across a relatively narrow valley or gully. In this form of the invention the sill 10, upright 19 and the various parts connected with the latter are dispensed with, while the angle irons 29, and 42 are connected together by fence stringers 60. As the operation of the movable parts of the fence disclosed in Figs. 6, 7 and 8 is identical with that of the corresponding parts in Figs. 1, 2, 3, 4 and 5, same will not be referred to in detail.

What is claimed is:

In a flood fence, the combination of spaced uprights, shafts journaled on said uprights and disposed at right angles to the latter, arms secured to the adjacent ends of said shafts transversely of the latter, corresponding lateral extensions on the ends of said arms disposed in a plane at right angles to the shafts, weights on the free ends of said extensions, and cross members connecting the arms at the end thereof remote from said weights, the connected ends of said arms being normally held in their lowermost position by said weights and movable under the influence of pressure thereagainst in one direction to shift said weights on the opposite side of the shafts from the connected ends of the arms whereby the weights will act automatically to swing the connected ends of said arms to their uppermost position.

In testimony whereof, I affix my signature, in presence of two witnesses.

FRANK KRUPICKA.

Witnesses:
 FRANK KARREBAUM,
 N. F. MARKEY.